United States Patent
Akay et al.

(10) Patent No.: US 11,078,885 B2
(45) Date of Patent: Aug. 3, 2021

(54) FLOW CONTROL ARRANGEMENT FOR A WIND TURBINE ROTOR BLADE

(71) Applicant: SIEMENS GAMESA RENEWABLE ENERGY A/S, Brande (DK)

(72) Inventors: Busra Akay, Herning (DK); Peder Bay Enevoldsen, Vejle (DK); Alejandro Gomez Gonzalez, Aarhus (DK); Jesper Monrad Laursen, Silkeborg (DK); Alex Loeven, Herning (DK); Frank Scheurich, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 59 days.

(21) Appl. No.: 16/327,347

(22) PCT Filed: Apr. 10, 2017

(86) PCT No.: PCT/EP2017/058492
§ 371 (c)(1),
(2) Date: Feb. 22, 2019

(87) PCT Pub. No.: WO2018/041420
PCT Pub. Date: Mar. 8, 2018

(65) Prior Publication Data
US 2019/0186463 A1 Jun. 20, 2019

(30) Foreign Application Priority Data
Aug. 30, 2016 (EP) ..................................... 16186403

(51) Int. Cl.
*F03D 7/02* (2006.01)
*F03D 1/06* (2006.01)
(Continued)

(52) U.S. Cl.
CPC ......... *F03D 7/0232* (2013.01); *F03D 1/0675* (2013.01); *F03D 3/062* (2013.01);
(Continued)

(58) Field of Classification Search
CPC ...... F03D 7/0232; F03D 7/022; F03D 7/0224; F03D 7/0228; F03D 7/0276; F03D 7/042;
(Continued)

(56) References Cited

U.S. PATENT DOCUMENTS

| | | |
|---|---|---|
| 3,136,501 A | 6/1964 | Barber |
| 5,106,265 A | 4/1992 | Holzem |

(Continued)

FOREIGN PATENT DOCUMENTS

| | | |
|---|---|---|
| CN | 109996956 A | 7/2019 |
| EP | 1320680 A1 | 6/2003 |

(Continued)

OTHER PUBLICATIONS

PCT International Search Report and Written Opinion for PCT/EP2017/058492.

*Primary Examiner* — Courtney D Heinle
*Assistant Examiner* — Danielle M. Christensen
(74) *Attorney, Agent, or Firm* — Schmeiser, Olsen & Watts LLP

(57) ABSTRACT

A rotor blade for a wind turbine is provided. The rotor blade includes an aerodynamic device for influencing the airflow flowing from the leading-edge section of the rotor blade to the trailing edge section of the rotor blade. The aerodynamic device is mounted at a surface of the rotor blade and includes a pneumatic or hydraulic actuator, such as a hose a cavity, of which the volume depends on the pressure of a fluid being present inside the pneumatic or hydraulic actuator. The rotor (Continued)

blade further includes a control unit for controlling the pressure of the fluid in the hose or the cavity of the aerodynamic device.

18 Claims, 9 Drawing Sheets

(51) Int. Cl.
*F03D 3/06* (2006.01)
*F03D 7/04* (2006.01)

(52) U.S. Cl.
CPC ........... *F03D 7/022* (2013.01); *F03D 7/0224* (2013.01); *F03D 7/0228* (2013.01); *F03D 7/0276* (2013.01); *F03D 7/042* (2013.01); *F05B 2240/122* (2013.01); *F05B 2240/30* (2013.01); *F05B 2240/311* (2013.01); *F05B 2270/604* (2013.01); *F05B 2270/605* (2013.01); *Y02E 10/72* (2013.01)

(58) Field of Classification Search
CPC .. F03D 3/062; F03D 1/0675; F05D 2240/122; F05D 2240/30; F05D 2240/311; F05D 2270/604; F05D 2270/605; F05D 2270/32; F05B 2240/122; F05B 2240/30; F05B 2240/311; F05B 2270/604; F05B 2270/605; F05B 2270/32
See application file for complete search history.

(56) References Cited

U.S. PATENT DOCUMENTS

| | | | |
|---|---|---|---|
| 5,326,050 A | 7/1994 | Zell | |
| 6,837,465 B2* | 1/2005 | Lisy | B64C 3/58 244/204.1 |
| 8,801,387 B2* | 8/2014 | Fukami | F03D 1/0633 416/223 R |
| 8,851,840 B2 | 10/2014 | Hancock et al. | |
| 2003/0091436 A1 | 5/2003 | Stiesdal | |
| 2008/0292461 A1 | 11/2008 | Stiesdal | |
| 2009/0284016 A1 | 11/2009 | Van Dam et al. | |
| 2011/0110777 A1 | 5/2011 | Abdallah et al. | |
| 2011/0116927 A1 | 5/2011 | Hancock et al. | |
| 2011/0142595 A1* | 6/2011 | Santiago | F03D 1/0675 415/4.3 |
| 2012/0134803 A1 | 5/2012 | McGrath et al. | |
| 2015/0010407 A1* | 1/2015 | Zamora Rodriguez | F03D 1/0633 416/236 R |
| 2015/0098820 A1 | 4/2015 | Dixon et al. | |
| 2016/0076517 A1 | 3/2016 | Butterworth et al. | |
| 2018/0058424 A1 | 3/2018 | Egedal et al. | |
| 2018/0171975 A1* | 6/2018 | Rohm | F15D 1/10 |

FOREIGN PATENT DOCUMENTS

| | | |
|---|---|---|
| EP | 1320680 B1 | 4/2005 |
| EP | 1623111 B1 | 9/2008 |
| EP | 2402595 A2 | 1/2012 |
| EP | 2664791 A2 | 11/2013 |
| WO | WO2004099608 A1 | 11/2004 |
| WO | WO 2004099608 A1 | 11/2004 |

* cited by examiner

FLOW CONTROL ARRANGEMENT FOR A WIND TURBINE ROTOR BLADE

CROSS-REFERENCE TO RELATED APPLICATIONS

This application claims priority to PCT Application No. PCT/EP2017/058492, having a filing date of Apr. 10, 2017, which is based on European Application No. 16186403.8, having a filing date of Aug. 30, 2016, the entire contents both of which are hereby incorporated by reference.

FIELD OF TECHNOLOGY

The following relates to a rotor blade of a wind turbine, wherein the rotor blade comprises an aerodynamic device for influencing the airflow flowing from the leading-edge section to the trailing edge section of the rotor blade. Furthermore, the following relates to a wind turbine for generating electricity comprising at least one such rotor blade.

BACKGROUND

It is known to use aerodynamic devices for influencing the airflow which flows from the leading-edge section to the trailing edge section of a rotor blade of a wind turbine. Examples of such an aerodynamic device may be a spoiler or a flap. These aerodynamic devices may be configured such that its shape and/or orientation can be regulated, e.g. by a pneumatic or hydraulic actuator.

An example of an aerodynamic device which can be actuated pneumatically is, for instance, disclosed in the international patent application WO 2004/099608 A1.

Another example of an activatable aerodynamic device is disclosed in the European patent application EP 1 320 680 A1. Herein, the aerodynamic device, which is referred to as a spoiler, is used for activating or deactivating a vortex generator which is placed downstream of the spoiler.

In conventional pneumatically actuated spoilers, the pneumatic actuator expands when the pressurized fluid is blown through the actuator, and the spoiler is raised from a flat configuration into an upright position. This in general spoils the airflow flowing over the surface of the rotor blade (which is the reason why such a device is referred to as a spoiler) and may, depending e.g. on the chordwise position of the spoiler on the airfoil, induce stall of the airflow. As a consequence, the lift of the rotor blade may be reduced, which can be desired under certain operational conditions of the wind turbine.

A characteristic feature of known spoilers is that a positive pressure, i.e. a pressure above atmospheric pressure, is used for "activating" the spoiler and inducing the lift reduction (and load alleviation) of the rotor blade.

A drawback thereof is that in an emergency case, i.e. in a case where control over the aerodynamic device is lost, the pneumatic actuator collapses and moves into the configuration where it is substantially flat with regard to the surface of the rotor blade. This, however, means that the lift of the rotor blade is high, which is generally undesired in an emergency case.

SUMMARY

An aspect relates to an improved flow control arrangement which overcomes the mentioned drawback of existing flow control arrangements.

According to embodiments of the invention, there is provided a rotor blade for a wind turbine. The rotor blade comprises an aerodynamic device for influencing the airflow flowing from the leading-edge section of the rotor blade to the trailing edge section of the rotor blade. The aerodynamic device is mounted at a surface of the rotor blade and comprises a pneumatic or hydraulic actuator, such as a hose or a cavity, of which the volume depends on the pressure of a fluid being present inside the pneumatic or hydraulic actuator. The rotor blade further comprises a control unit for controlling the pressure of the fluid in the pneumatic or hydraulic actuator of the aerodynamic device. The aerodynamic device is in a first configuration when no pressure application to the fluid in the pneumatic or hydraulic actuator is induced by the control unit, and is in a second configuration when the control unit induces the application of a positive or negative pressure to the fluid in the pneumatic or hydraulic actuator. The rotor blade is furthermore characterized in that its lift in the first configuration is smaller than the lift of the rotor blade in the second configuration.

In contrast to all known spoilers, which are in upright position and induce stall if pressure is applied and which are flat if no pressure is applied, the inventors of embodiments of the present invention have realized that by reversing this mechanism a fail-safe spoiler can be provided. In other words, by providing an aerodynamic device in the form of an spoiler which is in an upright position if no pressure is applied and which is flat if a (positive or negative) pressure is applied, it is ensured that in an emergency case, when connection with the pneumatic or hydraulic actuator is disrupted and control over the pneumatic or hydraulic actuator is lost, the lift of the rotor blade is as small as possible.

There exist many different terms for aerodynamic devices which are destined to selectively increase the lift of the rotor blade by some sort of change in configuration or orientation. They are, for instance, denoted as spoilers, flaps or—more generic—as lift enhancing means. In the present application, the term "aerodynamic device" refers to all those devices which are able—upon activation by a pneumatic or hydraulic actuator such as a hose or a cavity—to influence the airflow flowing from the leading-edge section of the rotor blade to the trailing edge section of the rotor blade. Usually, this impact on the airflow is accompanied by a change in the local lift coefficient and, consequently, also in the value of the overall lift of the rotor blade.

Both pneumatic and hydraulic actuators are suitable to be used in embodiments of the present invention. Also, if in the following it is only referred to pneumatic actuators, embodiments of the claimed invention may interchangeably be also carried out with a hydraulic actuator.

The first configuration is characterized in that—by purpose or by accident—no pressure is applied to the fluid which is present in the hose or in the cavity of the aerodynamic device. In this situation, the aerodynamic device shall contribute to a reduction as large as possible of the lift of the rotor blade. As the lift correlates with the load of the rotor blade (and related components of the wind turbine), this scenario is usually desired in the case of a failure of the actuator system of in the case of an emergency shutdown of the wind turbine.

The second configuration is characterized in that the lift of the rotor blade is increased compared to the first configuration. The aerodynamic device may be configured such that there is only an "on-off" regulation of the aerodynamic device, i.e. that the aerodynamic device is either inactive or fully active, or that a variable degree of activation of the aerodynamic device can be chosen—depending e.g. on the pressure which acts on the fluid in the pneumatic actuator.

Note that the notion "pressure" in the context of this patent application is understood to encompass both positive and negative pressure in reference to a neutral reference pressure. Positive pressure is also called "overpressure"; negative pressure is also referred to as "low pressure", relatively speaking.

Descriptively speaking, in the case of positive pressure, fluid is pressed into the hose or the cavity of the aerodynamic device such that the pressure inside the hose or the cavity is greater than the atmospheric pressure outside of the hose or the cavity. In the opposite case of a negative pressure, the fluid is sucked out of the hose or the cavity such that the pressure inside the hose or the cavity is smaller compared to the atmospheric pressure outside and may even approach technical vacuum. In both cases, control or action of the pressure supply and pressure control system is needed. In these cases, a lift increase of the rotor blade is desired.

However, in the opposite case, where no pressure—neither positively nor negatively—is supplied to the hose or the cavity of the aerodynamic device, the aerodynamic device moves into a configuration where the airflow flowing across the aerodynamic device is spoiled, which leads to a drop-in lift and load of the rotor blade. Thus, a fail-safe operation of the system can be ensured.

Obviously, the aerodynamic device is not able to completely eliminate the lift of the rotor blade and may even not be able to limit or reduce the lift of the rotor blade to a very large extent. The decisive point is, however, that the aerodynamic device is in a position that, when no pressure is applied to the fluid in the hose or the cavity, the lift of the rotor blade is reduced as much as possible.

Generally, note that in the context of this patent application, a hose and a cavity are meant as two examples of pneumatic actuators. The person skilled in the art is aware that there might also exist equivalent means to realize the intended effect of a hose or an actuator.

In an embodiment of the invention, the aerodynamic device comprises a first section which, in the first configuration of the aerodynamic device, protrudes away from the surface of the rotor blade.

The first section is advantageously relatively stiff and rigid. The first section needs to feature a certain rigidity as it is destined to be in upright position under certain operational conditions, namely when no pressure is applied to the aerodynamic device. As keeping the upright position involves resisting the pressure of the airflow flowing from the leading-edge section to the trailing edge section of the rotor blade, a certain rigidity of the first section is advantageous.

In another embodiment of the invention, the aerodynamic device comprises a bending part which is made of flexible material and which allows the change of configuration of the aerodynamic device from the first configuration to the second configuration and vice versa.

The bending part of the aerodynamic device can be seen as a hinge allowing a limited angle of rotation between two further sections of the aerodynamic device, one section on the one side of the hinge, the other section on the other side of the hinge. Obviously, the bending part needs to ensure flexibility over a long time and during harsh conditions. Suitable materials comprise any synthetic materials, such as plastics, but also rubber.

In another embodiment of the invention, the protrusion, i.e. the projection of the first section away from the surface of the rotor blade is caused, or at least supported, by pretensioning the bending part of the aerodynamic device.

One concrete embodiment of realizing a pneumatically activated fail-safe aerodynamic device contains all the mentioned features: It comprises a first section, which is destined to protrude, i.e. project away from the surface of the rotor blade when no pressure is applied to the pneumatic actuator (which could be hose or a cavity); it comprises a flexible bending part which ensures a reversible change from the upright to the flat configuration of the aerodynamic device, in particular of the first section thereof; and the first section protrudes from the surface of the rotor blade for the reason as it features a pretension of particularly the bending part.

Another concrete embodiment of realizing a pneumatically activated fail-safe aerodynamic device substitutes the pretensioned section by a specifically designed bending part, which acts as a hinge such that, when (positive) pressure is applied to the pneumatic actuator, the protruding first section of the aerodynamic device moves downwards towards the surface of the rotor blade.

In another embodiment of the invention, the aerodynamic device is, in its second configuration, predominantly or even completely embedded into the shell of the rotor blade.

This has the technical effect that the risk of inducing stall of the airflow flowing across the aerodynamic device is minimized. In other words, the airflow flowing across the aerodynamic device (or, in other words, flowing from the leading-edge section to the trailing edge section of the rotor blade) is as least as possible spoiled by the presence of the aerodynamic device. Consequently, the lift of the rotor blade is enhanced as much as possible.

Partially or completely embedding the aerodynamic device into the shell of the rotor blade may be realized by provided a suitable recess or groove in the blade shell. The blade shell of a rotor blade of a wind turbine is commonly made of a fiber-reinforced laminate. Provision of a suitable recess or groove could be realized already during manufacturing of the blade shell. Alternatively, the recess or groove can be cut out after the shell of the rotor blade is manufactured.

In another embodiment of the invention, the aerodynamic device extends substantially parallel to the length axis of the rotor blade.

In this regard, the length axis is defined as the axis (or line) extending from the root to the tip of the rotor blade. In the case of a pitchable rotor blade, the length axis generally coincides with the pitch axis of the rotor blade.

In another embodiment of the invention, the aerodynamic device extends over at least ten percent, in particular over at least fifteen percent, of the length of the rotor blade.

By this, a lift variation to a significant extent can be achieved by the proposed fail-safe aerodynamic device.

Particularly, the aerodynamic device is mounted in the outboard part of the rotor blade, as in this region the impact on the lift of the rotor blade is highest.

In another embodiment of the invention, the aerodynamic device is placed between the leading edge of the rotor blade and fifty percent, in particular twenty percent, of the chord length of the rotor blade, as measured from the leading edge.

The type of aerodynamic device to which embodiments of the present invention particularly relates is a device which is able to induce flow separation or ultimately stall of the airflow flowing across it. Stall may be described as the condition when the airflow separates from the surface. Its impact on the lift (coefficient) is that, if stall occurs, the lift (coefficient) begins to decrease with increasing angle of attack. After the angle of attack at which stall occurs, the lift coefficient can under some circumstances increase again with increasing angle of attack. In the cases where there is no attached flow at all (i.e. when the airfoil is always in stalled conditions), there may always be an increasing trend of lift as a function of angle of attack for relevant ranges of angle of attack. In all these situations, nevertheless, a stalled airfoil is characterized by the inability of the airfoil to guide the airflow. It is furthermore characterized by highly unstable and three-dimensional fluid structures on the surface of the airfoil, and it is also furthermore characterized by high values of drag.

In certain operational conditions of the wind turbine, a separation of the airflow from the surface of the rotor blade and an accompanying loss in lift is undesired. In other operational conditions of the wind turbine, however, this result is desired—namely, when the load of the rotor blade and related components at the wind turbine is aimed to reduce.

By experience, a preferred chordwise position of a stall inducing device is in the upstream part or the mid-part of the airfoil profile, in terms of its chordwise position. Although downstream placement, i.e. a placement of the aerodynamic device close to the trailing edge shall not be excluded, the preferred location is further upstream than the trailing edge section.

In another embodiment of the invention, the rotor blade further comprises a flow regulating unit for influencing the airflow flowing from the leading-edge section of the rotor blade to the trailing edge section of the rotor blade.

The combination of a fail-safe aerodynamic device and a flow regulating unit has some interesting and surprising effects which will be described in more detail in the following.

At first, an example of a flow regulating unit is a vortex generator. Vortex generators may be used on wind turbine rotor blades in the inboard section of the rotor blade to increase the angle of attack of the airfoils at which flow separation or stall occurs. Furthermore, they can also be employed in the mid-span and outboard sections. Vortex generators are typically placed on the suction side of the rotor blade, and in the fore portion of the airfoil. Common locations range from 20% to 50% of the chord, as measured from the leading edge of the rotor blade.

Vortex generators may be partially or completely submerged within the boundary layer of the airfoil flow and increase the energy level of the boundary layer behind, i.e. downstream of them. The effect of this "re-energization" is a delay (this means: occurring at higher angles of attack) of the onset of separation of the boundary layer and of the point of stall. This is oftentimes a desired effect in the inboard sections of an airfoil during normal production, but might be an unwanted effect in other situations due to excess levels of loads.

In an embodiment of the invention, both the aerodynamic device and the flow regulating unit are mounted on the suction side of the rotor blade.

As it is well known to the person skilled in the art, a rotor blade generally comprises an airfoil portion which is characterized in that it is able to generate lift. Therefore, a suction side and a pressure side can be attributed to the airfoil. These both sides are typically separated or limited from each other by the leading edge and the trailing edge of the rotor blade.

Flow regulating units are frequently more effective on the suction side compared to the pressure side of the rotor blade. Therefore, the rotor blade comprises in an advantageous embodiment the placement of the flow regulating unit and the spoiler both on the suction side of the rotor blade. This should, however, not exclude the possibility that these components may also be arranged on the pressure side of the rotor blade where they could also realize a beneficial effect on the aerodynamic properties of the rotor blade.

The advantage of positioning both the aerodynamic device and the flow regulating unit on one side is that the aerodynamic device can "interact" with the flow regulating unit, particularly if the flow regulating unit is placed downstream of the aerodynamic device (in other words, the flow regulating unit is placed between the aerodynamic device and the trailing edge of the rotor blade). By interaction or "association" of both components, it is meant that the aerodynamic device is principle able to activate ("switch on") or deactivate ("switch off") the flow regulating unit.

The notion that the aerodynamic device is associated with the flow regulating is to be understood in a way that the aerodynamic device is capable to influence the aerodynamic efficiency of the flow regulating unit. In other words, the aerodynamic device is able to influence the airflow flowing from the leading-edge section to the trailing edge section of the rotor blade in a way that, depending on the status or configuration of the aerodynamic device, the airflow impinges on the flow regulating unit differently.

Experiences have shown that an optimum impact of the aerodynamic device on the flow regulating unit can be achieved if the chordwise distance between the aerodynamic device and the flow regulating unit is between ten percent and fifty percent of the chord length of the rotor blade. Naturally, the exact number depends on the specific design of the rotor blade and is also not limited to the given range of chordwise separation.

In another embodiment of the invention, the flow regulating device is placed between the leading edge of the rotor blade and the aerodynamic device. In this regard, a chordwise distance between the aerodynamic device and the flow regulating unit between one percent and twenty percent of the chord length of the rotor blade seems to be advantageous.

In yet another embodiment, the flow regulating unit is not placed downstream, i.e. "behind", the aerodynamic device, but the aerodynamic device itself is equipped with the flow regulating unit.

In principle, this may lead to a similar effect as for the separately arranged flow regulating unit: In the first configuration of the aerodynamic device, namely in the case that no pressure is applied to its pneumatic actuator and the airflow flowing across the aerodynamic device is stalled, the flow regulating unit has no or only negligible impact. However, in the second configuration of the aerodynamic device, wherein the first section of the aerodynamic device is not protruding but comparatively flat, the flow regulating unit, which is arranged on the aerodynamic device itself, is active and even further increases the lift of the rotor blade.

Generally speaking—and this applies to both placements of the aerodynamic device, behind or at the aerodynamic device—the flow regulating unit is aerodynamically inactive in the first configuration of the aerodynamic device and aerodynamically active in the second configuration of the aerodynamic device. In this context, an aerodynamically active flow regulating unit implies an increase of the lift of the rotor blade. Conversely, an aerodynamically inactive flow regulating unit implies a reduced lift of the rotor blade.

The flow regulating unit and the aerodynamic device may be attached to the surface of the rotor blade by various means. Common means to attach the aerodynamic devices are an adhesive. Alternatively, bolts or screws, magnets, Velcro joints or rivets could be used to attach the flow regulating unit and/or the aerodynamic device to the surface of the rotor blade.

Finally, embodiments of the invention are also related to a wind turbine for generating electricity comprising at least one rotor blade according to one of the embodiments described above. The wind turbine is a pitch-regulated wind turbine.

BRIEF DESCRIPTION

Some of the embodiments will be described in detail, with reference to the following figures, wherein like designations denote like members, wherein.

DETAILED DESCRIPTION

Note that the drawings are in schematic form. Similar or identical elements are referenced by the same or different reference signs.

Figure 1:
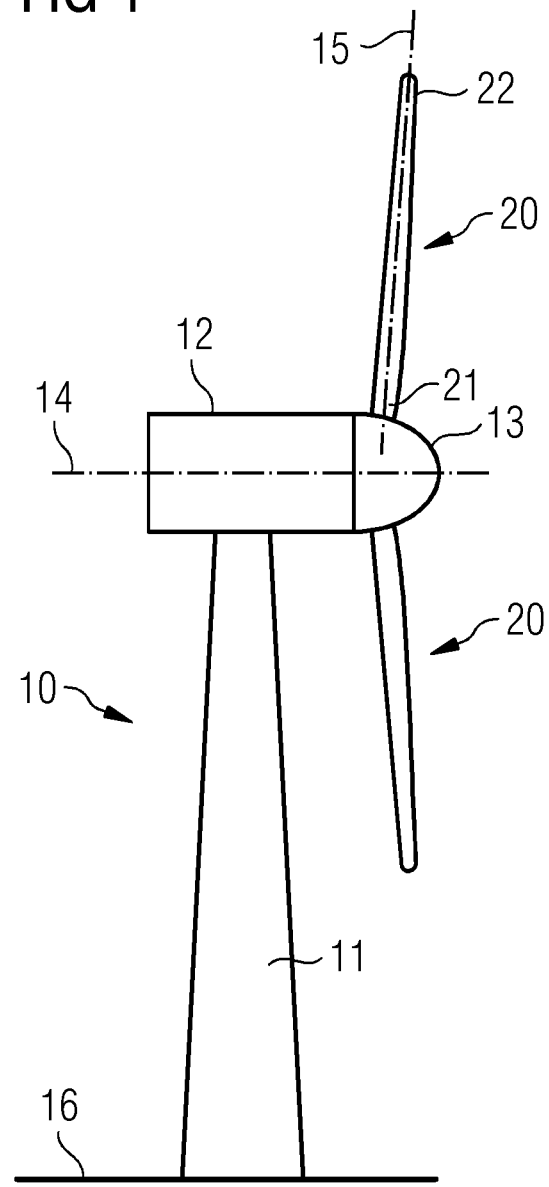
FIG. 1 shows a wind turbine.

FIG. 1 shows a conventional wind turbine 10 for generating electricity. The wind turbine 10 comprises a tower 11 which is mounted on the ground 16 by one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a substantially horizontal rotor axis 14.

The hub 13 is often described as being a part of the rotor, wherein the rotor is capable to transfer the rotational energy to the generator.

The hub 13 is the part at which the rotor blades 20 are mounted. Each rotor blade 20 is usually mounted pivotable to the hub 13. In other words, the rotor blades 20 can be pitched about pitch axes 15, respectively. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade. Note that in the example as shown in FIG. 1, only two rotor blades 20 are depicted. However, most modern wind turbines comprise three rotor blades.

Figure 2:
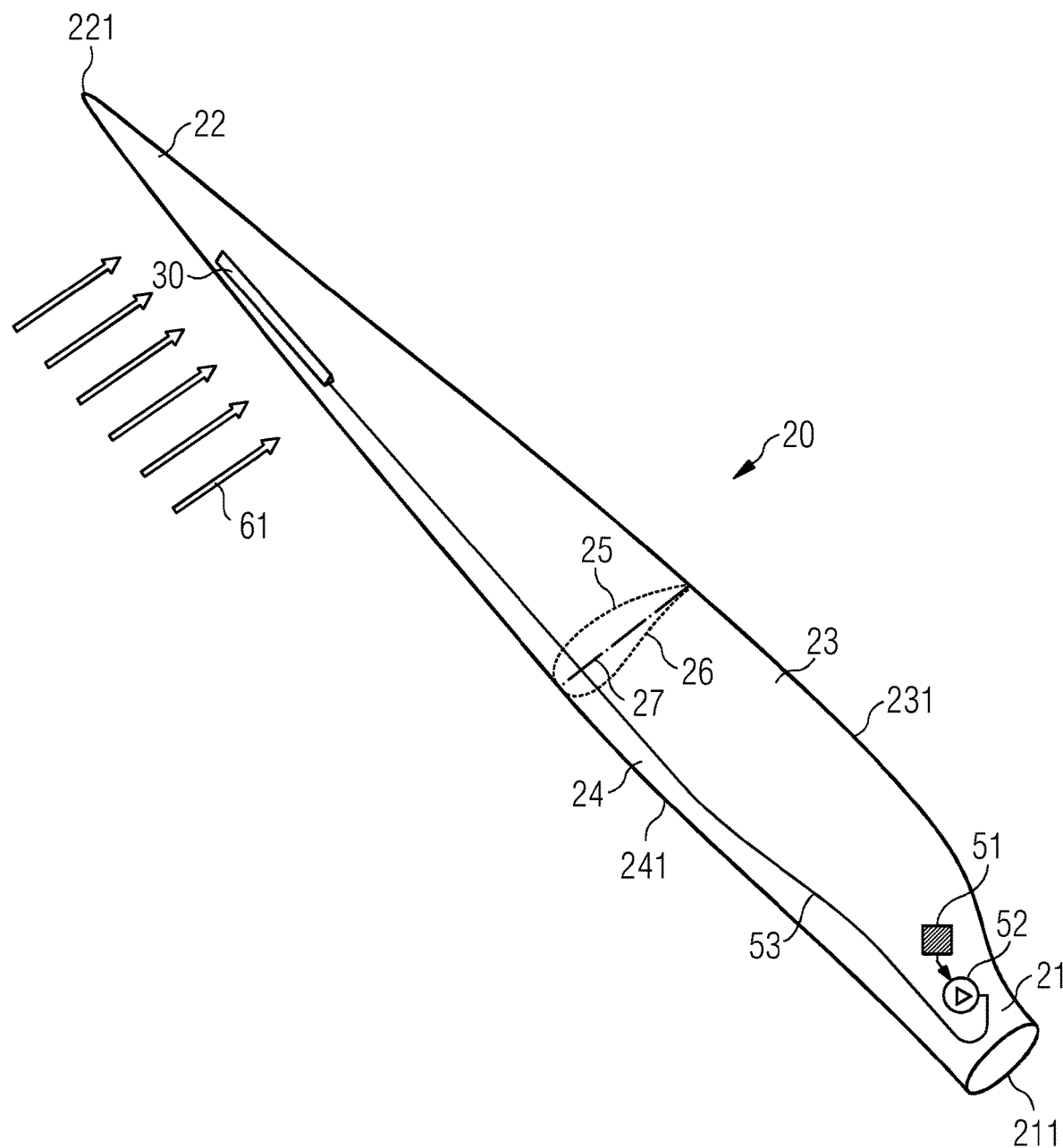
FIG. 2 shows a rotor blade of a wind turbine with an aerodynamic device.

FIG. 2 illustrates a rotor blade 20 comprising an aerodynamic device 30. The rotor blade 20 comprises a root section 21 with a root 211 and a tip section 22 with a tip 221. The rotor blade 20 furthermore comprises an airfoil section which is characterized in that it is able to generate lift and comprising a suction side 25 and a pressure side 26. The airfoil shape of the airfoil portion is symbolized by one airfoil profile which is shown in FIG. 2 and which illustrates the cross-sectional shape of the rotor blade at this spanwise position. Also note that the suction side 25 is divided or separated from the pressure side 26 by a chord line 27 which connects the leading edge 241 with the trailing edge 231 of the rotor blade 20. Also note that the area around the trailing edge 231 is commonly referred to as the trailing edge section 23. Likewise, the area around the leading edge 241 is commonly referred to as the leading-edge section 24.

A feature which distinguishes the rotor blade 20 as illustrated in FIG. 2 from a standard known art rotor blade is the provision of the aerodynamic device 30. The aerodynamic device 30 is arranged substantially along the length axis of the rotor blade, which is defined as the axis from the root 211 to the tip 221 of the rotor blade 20. In the example shown in FIG. 2, the aerodynamic device 30 extends over ca. fifteen percent of the length of the rotor blade.

The aerodynamic device 30 in FIG. 2 is movable by means of a pressure hose which will be shown and described in more detail in the following Figures. A pressure hose is one example of a pneumatic actuator. Another example of a pneumatic actuator is an (inflatable) cavity.

FIG. 2 furthermore discloses the pressure supply system of the aerodynamic device 30 comprising a control unit 51, a pressure supply system 52 and pressure lines 53. The pressure supply system 52 provides pressurized air. In this context, pressurized air not only comprises positive pressure but also negative pressure, wherein air is sucked (or "drawn") out of the pressure hose of the aerodynamic device 30. The pressure lines 53 could in practice be realized as tubes or pipes which do not significantly change their volume. Finally, the control unit 51 is responsible for setting a specific pressure at the pressure supply system 52 which subsequently leads to a certain predetermined pressure at the aerodynamic device 30.

In the example shown in FIG. 2, the control unit 51 and the pressure supply system 52 are located in the root section 21 of the rotor blade 20. However, the person skilled in the art is well aware that these parts could also be placed elsewhere in the wind turbine, such as e.g. in the hub of the wind turbine.

Figure 3:
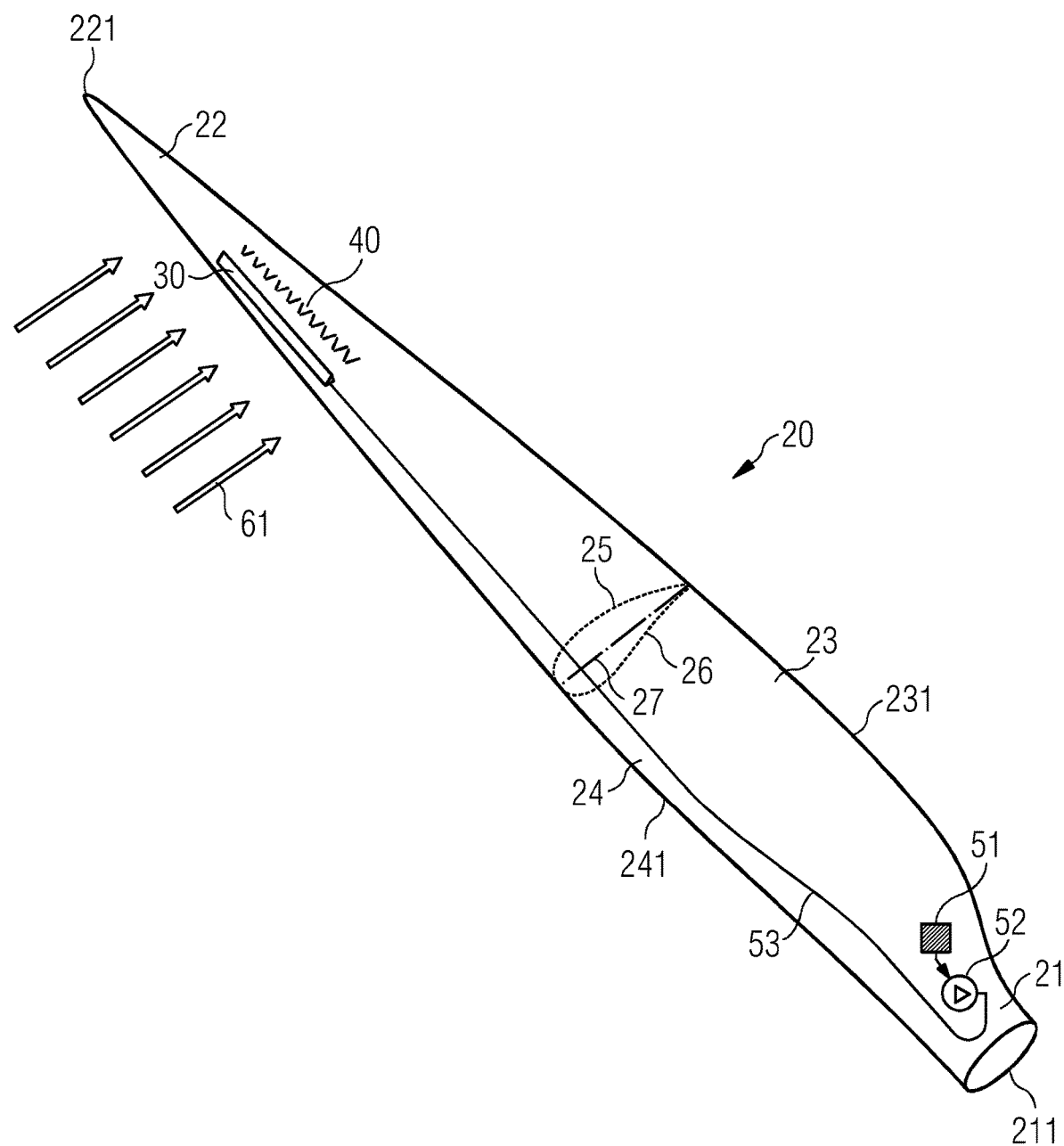
FIG. 3 shows a rotor blade of a wind turbine with an aerodynamic device and a flow regulating unit.

FIG. 3 shows a variant of the rotor blade shown in FIG. 2. The rotor blade as shown in FIG. 3 additionally comprises a flow regulating unit 40 comprising multiple pairs of vortex generators. Such vortex generators arranged in pairs on wind turbine rotor blades are well-known both from literature and concrete industrial products.

The flow regulating unit 40 is arranged downstream of the aerodynamic device 30. Therefore, the flow regulating unit can be "switched on" and "off" selectively by activating and deactivating the pneumatic actuator of the aerodynamic device 30.

Figure 4:
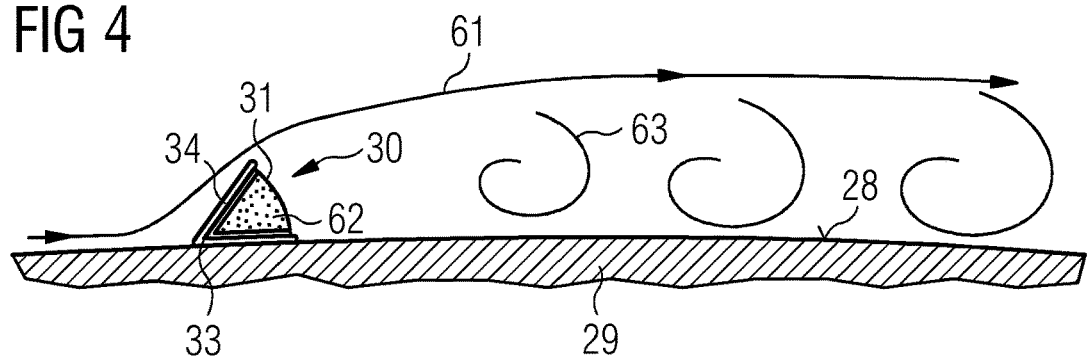
FIG. 4 shows a first embodiment of an aerodynamic device in its first configuration.
Figure 5:
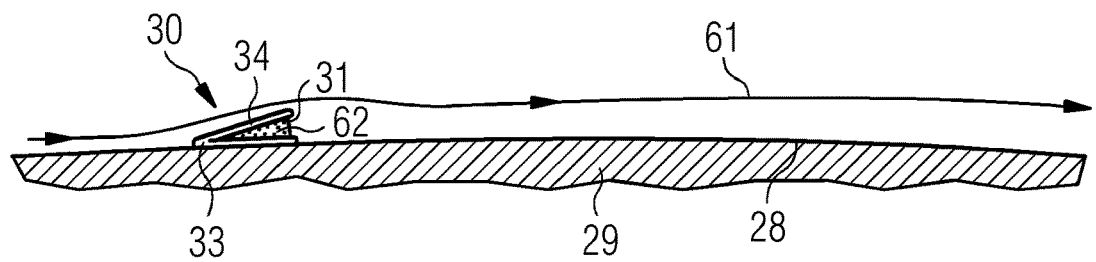
FIG. 5 shows the first embodiment in its second configuration.

FIGS. 4 and 5 illustrate a first embodiment of a fail-safe aerodynamic device 30 according to embodiments of the invention.

FIG. 4 shows the situation that the aerodynamic device 30 is in its first configuration. This means that in the situation as illustrated in FIG. 4, no pressure is applied to the pressure hose 31 of the aerodynamic device 30. As a consequence, the fluid 62 inside the hose 31 is at a predetermined pressure which may e.g. approach or be equal to the atmospheric pressure.

The aerodynamic device 30 comprises a first portion 34. The first portion 34 is relatively stiff and rigid. It is at least rigid enough to resist and deviate the airflow 61 which is flowing from the leading-edge section to the trailing edge section of the rotor blade. In the first configuration of the aerodynamic device 30, the first portion 34 of the aerodynamic device 30 protrudes. In other words, the first portion 34 projects away from the surface 28 of the rotor blade.

The aerodynamic device 30 further comprises a pneumatic actuator, which is realized as a hose 31 in the first embodiment of the aerodynamic device 30. The hose 31 comprises an elastic outer skin such that it can expand and collapse (or, in other words, inflate and deflate) reversibly and during many cycles.

The aerodynamic device 30 further comprises a bending part 33. The bending part 33 is made of flexible material, such as e.g. rubber or a synthetic material. The bending part 33 functions as a hinge. The bending part 33 enables a change of orientation of the first portion 34 between an upright position (as in FIG. 4) or a flat position (as in FIG. 5).

The reason why without application of pressure the aerodynamic device 30 does project upwards is due to the fact that the aerodynamic device 30 is provided with a pretension. In particular, it is the bending part 33, which is provided with a pretension.

The aerodynamic device 30 in its first configuration—as illustrated in FIG. 4—induces stall. This is visualized with relatively large vortices 63 downstream of the aerodynamic device 30. A consequence of the induced stall is a decrease in lift of the rotor blade and, consequently, a reduced loading of the rotor blade and related components of the wind turbine.

FIG. 5 shows the same aerodynamic device 30 as in FIG. 4, but in the second instead of the first configuration. The second configuration is different from the first one in that a negative pressure is applied to the fluid 62 inside the hose 31. As a consequence, the first section 34 has moved downwards towards the surface 28 of the rotor blade.

As a consequence, the airflow 61 flowing across the aerodynamic device 30 is influenced differently. In particular, the airflow 61 remains attached to the surface 28 of the rotor blade, thus that no flow separation, i.e. stall, occurs. As a consequence, the lift of the rotor blade increases.

The fail-safe feature of aerodynamic device 30 consists in the fact that if connection between the control unit/pressure supply system and the aerodynamic device 30 is disrupted, the aerodynamic device 30 automatically moves into the first configuration, cf. FIG. 4. As a consequence, the lift and load of the rotor blade is minimized, which is generally desired in the assumed case that connection between the control unit/pressure supply system and the aerodynamic device 30 is disrupted.

Figure 6:
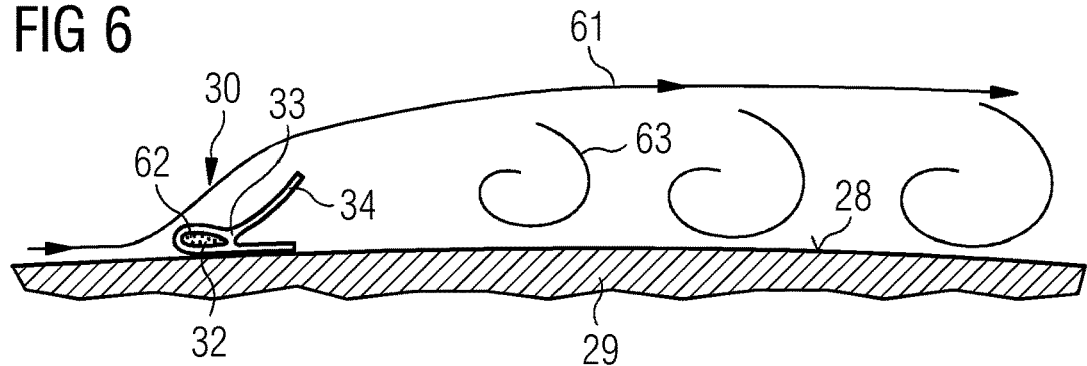
FIG. 6 shows a second embodiment of an aerodynamic device in its first configuration.
Figure 7:
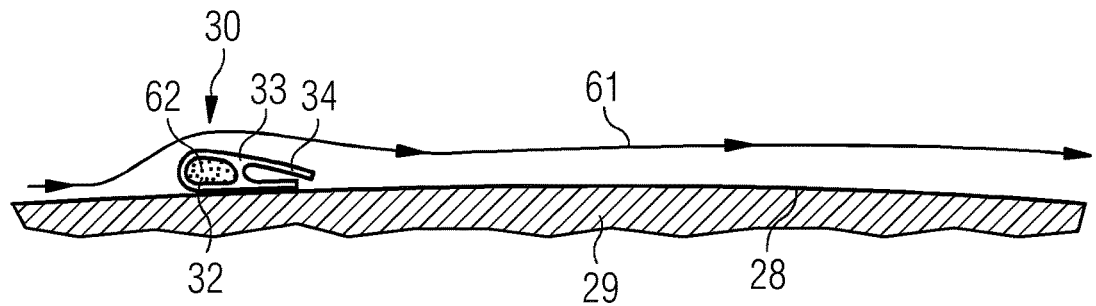
FIG. 7 shows the second embodiment in its second configuration.

FIGS. 6 and 7 show a second embodiment of an aerodynamic device 30. For sake of conciseness, similar or identical elements, which have already been introduced for the first embodiment of the aerodynamic device 30 will not be repeated.

FIG. 6 shows the aerodynamic device 30 in its first configuration, i.e. in its "neutral" position without application of any pressure by the pressure supply system. The airflow 61 is spoiled, stall is induced, and, consequently, lift and load is reduced.

The aerodynamic device 30 of the second embodiment is slightly differently designed compared to the aerodynamic device 30 of the first embodiment. Although both embodiments comprise a first portion 34, which protrude in the first configuration of the aerodynamic device 30 and which is buried (or embedded) in the second configuration, the change of configuration in the second embodiment is not realized by applying a negative pressure, but by applying a positive pressure. Descriptively speaking, in the first embodiment, the first portion 34 of the aerodynamic device 30 is brought downwards by drawing the fluid out of the pneumatic actuator, while in the second embodiment, this is achieved by pressing fluid into the pneumatic actuator.

The fail-safe mechanism is, however, achieved in both embodiments: A pressure (a positive one or a negative one) needs to be actively applied on the pneumatic actuator for achieving a high lift of the rotor blade. If no pressure is applied, the pneumatic actuator makes the first portion 34 move into the "small-lift", "low-load" configuration.

As a detail, the pneumatic actuator is realized as a hose 31 in the first embodiment and as a cavity 32 in the second embodiment. This is, however, not relevant for the functionality of the fail-safe mechanism. The mechanism would also perfectly work if the aerodynamic device of the first embodiment was realized as a cavity and the aerodynamic device of the second embodiment was realized as a hose.

Finally note that care must be taken during design of the second embodiment, in particular with regard of the hinge mechanism which induces aligning the first portion with the surface 28 of the rotor blade. At the same time, it needs to be ensured that the aerodynamic device 30 in its second configuration is flat enough to not spoil the airflow, although its pneumatic actuator is inflated.

Figure 8:
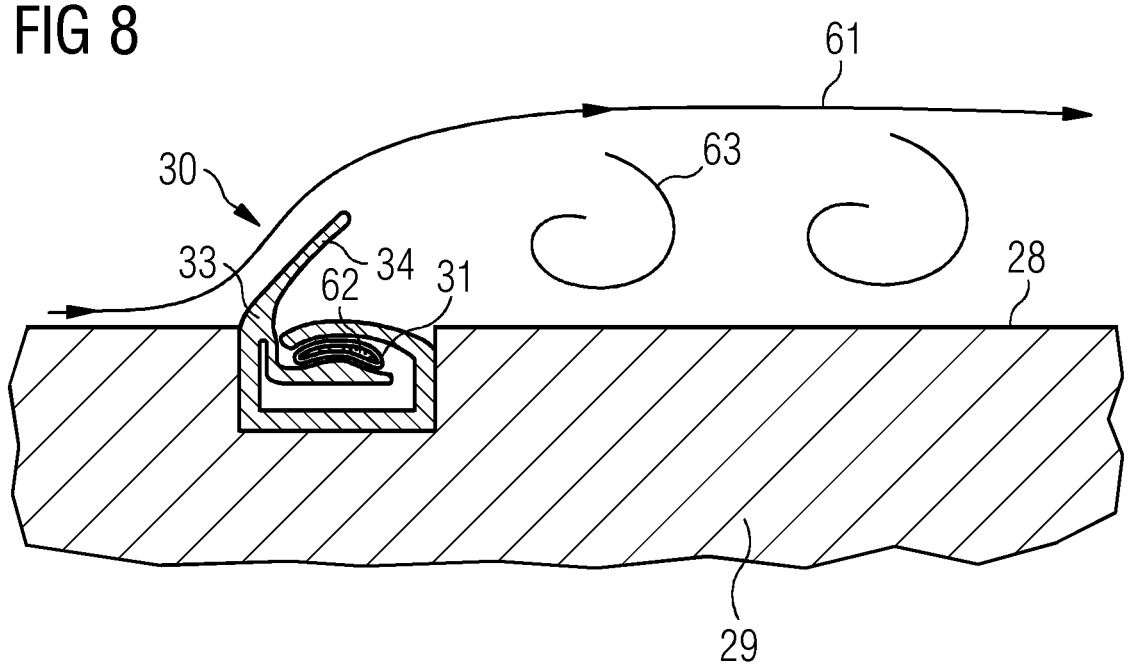
FIG. 8 shows a third embodiment of an aerodynamic device in its first configuration.
Figure 9:
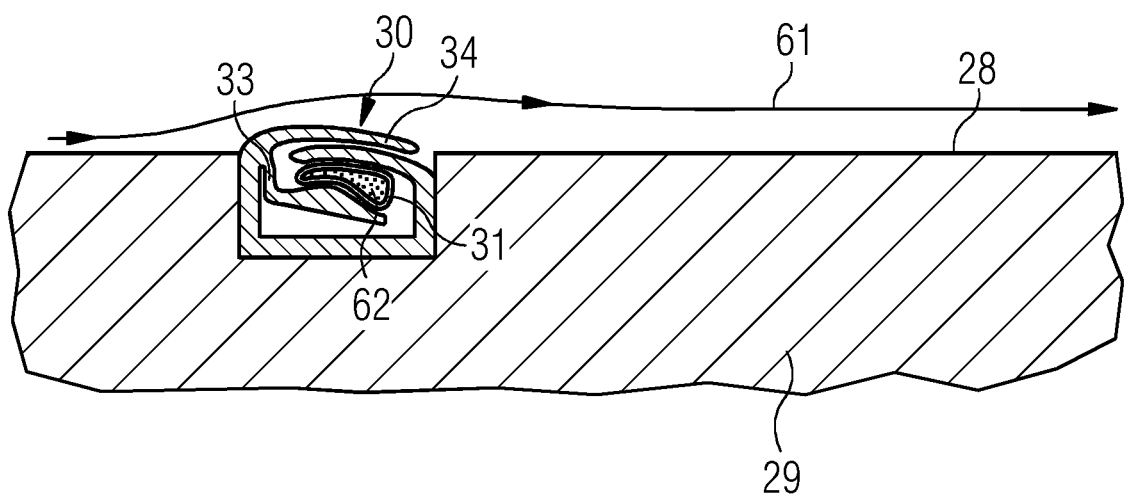
FIG. 9 shows the third embodiment in its second configuration.

FIGS. 8 and 9 show a third embodiment of an aerodynamic device 30. Again, for sake of conciseness, similar or identical elements, which have already been introduced for the first or second embodiment of the aerodynamic device 30 will not be repeated here.

FIG. 8 shows the aerodynamic device 30 in its first configuration, i.e. in its "neutral" position without application of any pressure by the pressure supply system. The airflow 61 is spoiled, stall is induced, and, consequently, lift and load is reduced.

In contrast to FIG. 8, FIG. 9 shows the aerodynamic device 30 in its second configuration. Here, the first portion 34 of the aerodynamic device 30 is flat such that the airflow 61 flowing across the aerodynamic device 30 is not stalled.

The similarity between the second and the third embodiment consists in that for both embodiments, a positive pressure needs to be applied to the pneumatic actuator of the aerodynamic device 30 to change the aerodynamic device 30 from its first into its second configuration.

The modification of the third embodiment with regard to the second embodiment is that in the third embodiment the aerodynamic device 30 is predominantly embedded into the shell 29 of the rotor blade. This has the advantage that drag of the aerodynamic device 30 is minimized. This is especially advantageous in the second configuration of aerodynamic device 30, when an increase as high as possible of the lift of the rotor blade is generally desired. The third embodiment of the aerodynamic device 30 proposes an attractive solution to this desire, as the aerodynamic device 30 is almost flush with the surface 28 of the rotor blade in its second configuration.

Figure 10:
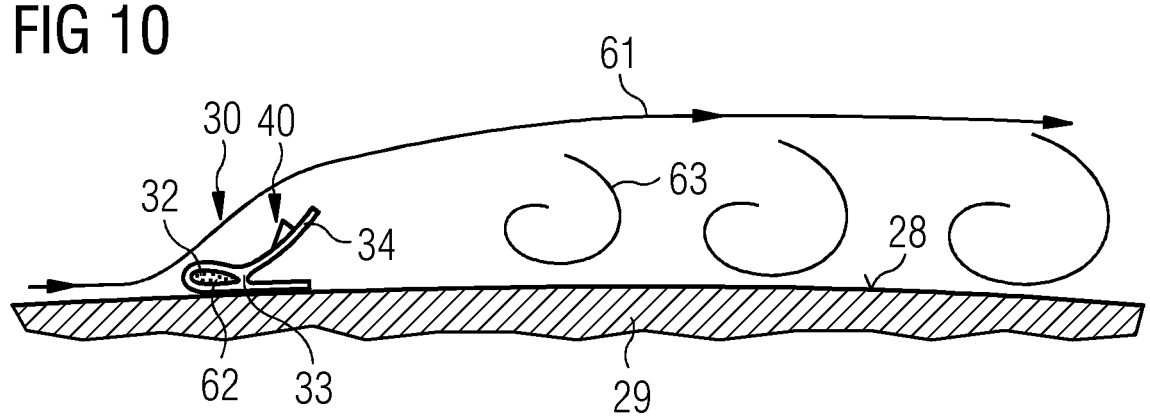
FIG. 10 shows an alternative of the second embodiment of the aerodynamic device in its first configuration.
Figure 11:
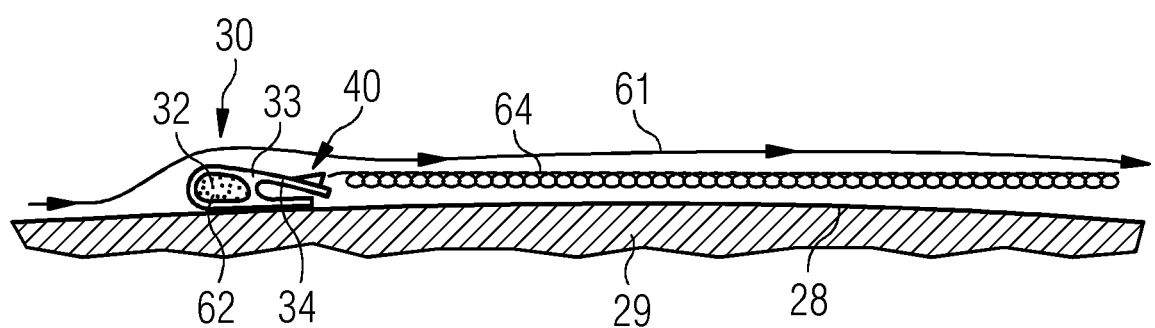
FIG. 11 shows the alternative of the second embodiment in its second configuration.

FIGS. 10 and 11 show a variant of the second embodiment of an aerodynamic device 30 according to embodiments of the invention. The sole difference between the aerodynamic device 30 as shown and described in FIGS. 6 and 7 is that the embodiment of the aerodynamic device 30 shown in FIGS. 10 and 11 additionally comprises a flow regulating unit 40 at its first portion 34. The flow regulating unit may be shaped as a pair of vortex generators.

The flow regulating unit 40 does not have a significant influence on the airflow 61 in the first configuration of the aerodynamic device 30. The airflow 61 is spoiled, i.e. stalled, anyway and the flow regulating unit 40 does not change this.

In the second configuration of the aerodynamic device 30, however, the airflow 61 is not only not spoiled by the aerodynamic device 30, but the boundary layer is even re-energized by re-energizing vortices 64, which are typically induced by vortex generators under suitable flow conditions. The effect is that the lift of the rotor blade is even further increased. In summary, the equipment of the aerodynamic device 30 by a flow regulating unit 40 is in principle capable to even further increase the lift of the rotor blade in the second configuration of the aerodynamic device 30.

Figure 12:
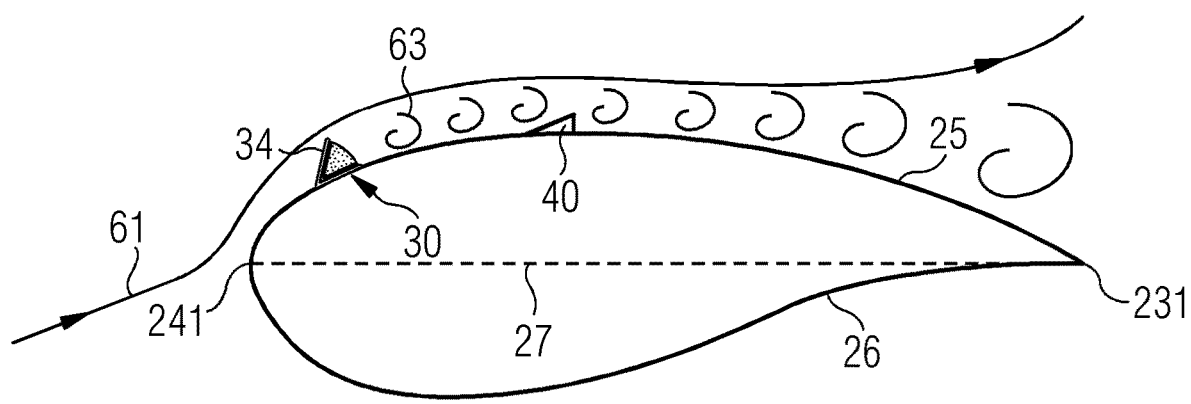
FIG. 12 shows an embodiment wherein an aerodynamic device is combined with a flow regulating unit being located downstream of the aerodynamic device.
Figure 13:
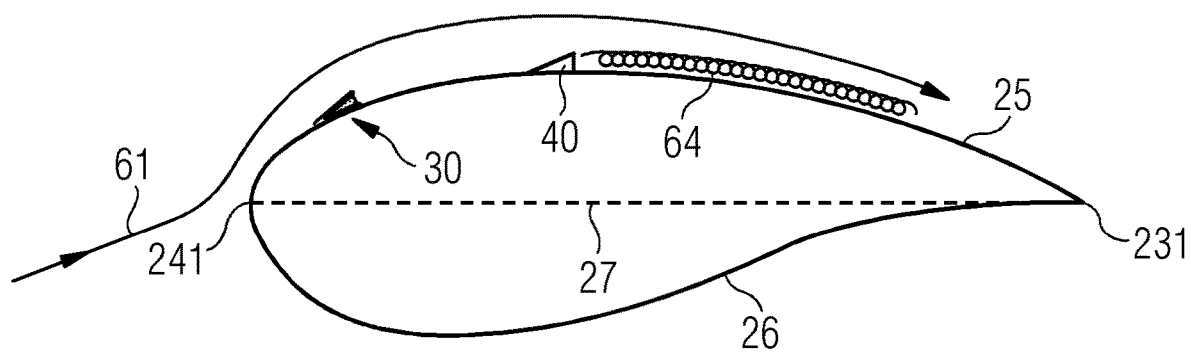
FIG. 13 shows an embodiment wherein an aerodynamic device is combined with a flow regulating unit being located downstream of the aerodynamic device.

FIGS. 12 and 13 shows a combination of the first embodiment of the aerodynamic device 30 as shown in FIGS. 4 and 5 with a flow regulating unit 40, such as a vortex generator. As known to the person skilled in the art, a vortex generator is in principle able to increase the lift of a rotor blade due to re-energizing vortices 64 which it may induce in the boundary layer.

Notably, the combination of a fail-safe aerodynamic device 30 with a flow regulating unit 40 results in a particularly powerful tool for, on the one hand, maximizing the lift of a rotor blade without, on the other hand, compromising safety issues in case of a failure of the system.

Looking first at FIG. 13, which is the situation where a lift of the rotor blade as high as possible is aimed for. This is achieved by the arrangement disclosed here, as the aerodynamic device 30 is made as flat as possible (by e.g. drawing air out of the pressure hose of the aerodynamic device 30) for not spoiling the airflow 61 flowing across it, and, at the same time, the flow regulating unit 40 ensures an additional increase in the lift due to the generation of re-energizing vortices 64. Thus, a lift of the rotor blade as high as possible is achieved.

In the case of a failure of the system, e.g. in a situation wherein the pneumatic actuator cannot be controlled, the aerodynamic device 30 automatically moves into the first configuration, which is depicted in FIG. 12. In the situation of loss of control over the pneumatic actuator, the aim is to minimize the lift of the rotor blade as much as possible because this involves a reduction of the load of the rotor blade and related components of the wind turbine as much as possible.

This maximum reduction of the lift is achieved by the arrangement disclosed in FIG. 12, as the aerodynamic device 30 induces a stall of the airflow 61 (symbolized in FIG. 12 by the generation of large-scale stall-inducing vortices 63). At the same time, the flow regulating unit 40 is simply "switched off", in other words deactivated. As the flow regulating unit 40 is arranged behind, i.e. downstream of the aerodynamic device 30, and the airflow 61 is deviated such by the protruding first portion 34 of the aerodynamic device 30 that it does not impinge suitably onto the flow regulating unit 40, the flow regulating unit 40 is not capable to generate re-energizing vortices for enhancing the lift of the rotor blade. Thus, the lift of the rotor blade is reduced as much as possible.

In summary, it can be seen that the combination of a fail-safe aerodynamic device 30 with a flow regulating unit 40 placed downstream of the aerodynamic device 30 represents a particularly useful and advantageous option for optimizing the aerodynamic properties of a rotor blade in a fail-safe manner.

Figure 14:
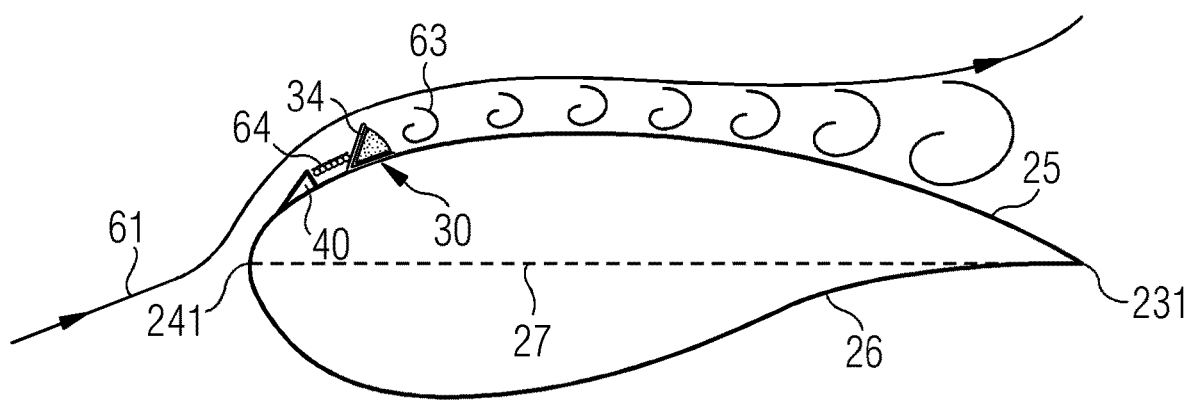
FIG. 14 shows an embodiment wherein an aerodynamic device is combined with a flow regulating unit being located upstream of the aerodynamic device.
Figure 15:
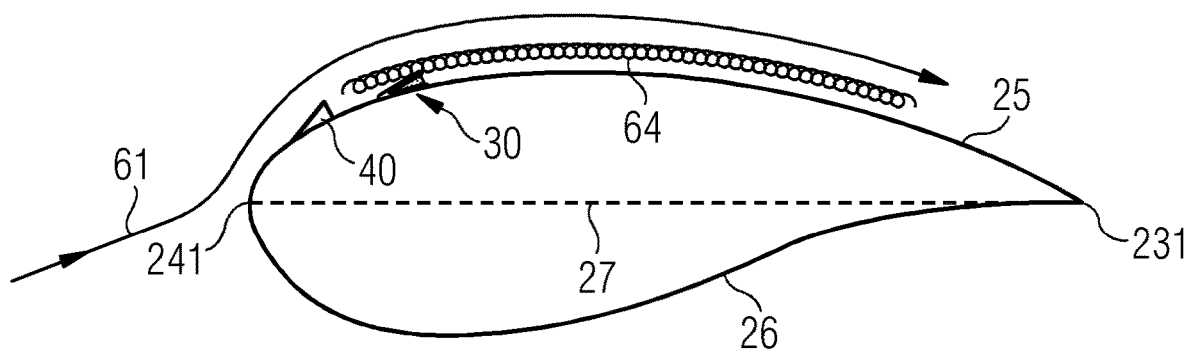
FIG. 15 shows an embodiment wherein an aerodynamic device is combined with a flow regulating unit being located upstream of the aerodynamic device.

FIGS. 14 and 15 show a different embodiment of combining an aerodynamic device 30 with a flow regulating unit 40.

In this embodiment, the flow regulating unit 40 is placed "before", i.e. upstream of the aerodynamic device 30. This does not allow the aerodynamic device 30 to directly activate or deactivate the flow regulating unit 40, but may, nevertheless, also represent an attractive option to achieve a high lift of a rotor blade without compromising safety issues in case of a failure of the system.

FIG. 15 represents the situation wherein the aerodynamic device 30 is in its second configuration, i.e. a lift of the rotor blade as high as possible is aimed for. This is effectively achieved by the arrangement as disclosed in FIG. 15, because the flow regulating unit 40 generates re-energizing vortices 64 which pass by the aerodynamic device 30 substantially undisturbed as the aerodynamic device 30 is "flat". This "flat" configuration of the aerodynamic device 30 may, in the exemplary design of the aerodynamic device 30 as shown in FIGS. 14 and 15, be achieved by applying a negative pressure to the pressure hose of the aerodynamic device 30.

If, for any reason, no pressure is applied to the pressure hose, then the first portion 34 of the aerodynamic device 30 changes its orientation and moves from the "flat" position into an upright position, cf. FIG. 14. This does, however, not directly impact the generation of re-energizing vortices 64 by the flow regulating unit 40, as the flow regulating unit 40 is located upstream of the aerodynamic device 30. When, however, these re-energizing vortices 64 shortly after being generated approach the aerodynamic device 30, in particular the protruding first section 34 thereof, these re-energizing vortices 64 are deviated the same as the remaining airflow 61 and are destroyed. As a consequence, the airflow 61 is separated from the suction side 25 of the rotor blade approximately at the location where the aerodynamic device 30 is situated. In summary, the small lift-enhancing effect of the re-energizing vortices 64 is heavily outweighed by the flow separation induced by the aerodynamic device 30 which is in its first configuration and the overall lift (and load) of the rotor blade is significantly reduced.

As it can be seen, also a combination of a flow regulating unit 40 and an aerodynamic device 30, wherein the flow regulating unit 40 is placed upstream of the aerodynamic device 30, represents an attractive option.

It shall be clear for the person skilled in the art, that any of the aerodynamic devices presented in this disclosure, in particular the three embodiments disclosed in FIGS. 4-9, as well as any obvious variants thereof can be combined with any sort of flow regulating units, in particular with any sort of vortex generators.

Figure 16:
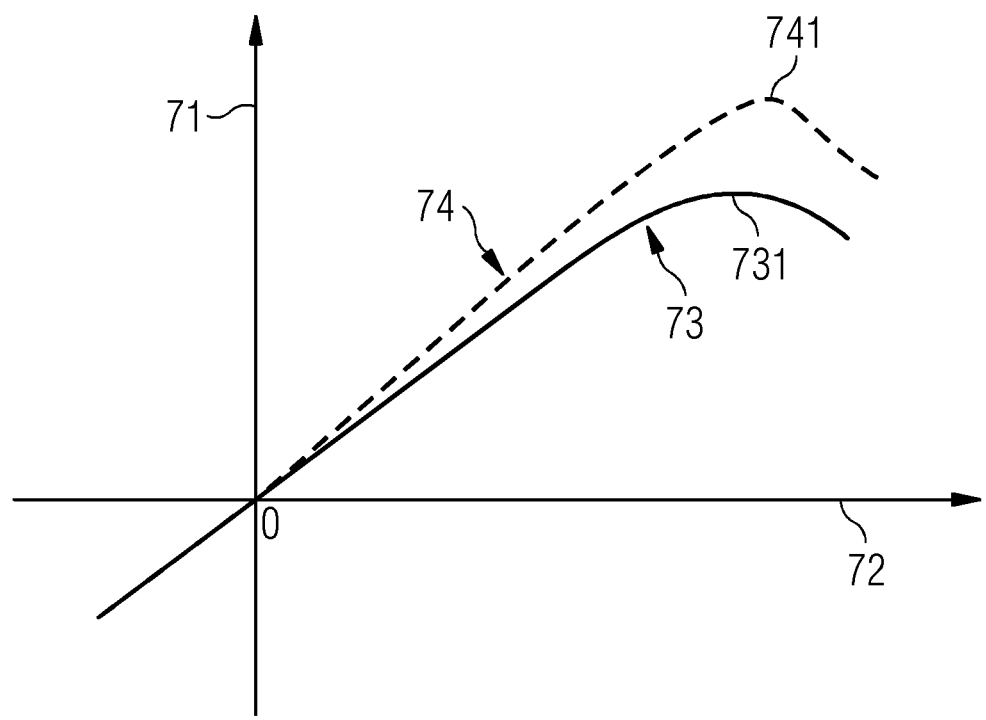
FIG. 16 shows lift curves of a rotor blade with an aerodynamic device in its first and second configuration.

Finally, FIG. 16 visualizes the difference between the first and second configuration of the aerodynamic device 30 in terms of its impact on the lift curve.

In FIG. 16, the lift 71 of the rotor blade is shown depending on the angle of attack 72. The first curve 73 represents the lift of the rotor blade when the aerodynamic device is in its first configuration. As usual, the lift 71 increases with increasing angles of attack 72 (at least for angles of attack 72 greater than zero) until a maximum value for the lift is reached. This maximum lift for the first curve 73 is referenced to by the reference sign 731.

The second curve 74 represents the lift of the rotor blade when the aerodynamic device is in its second configuration. Again, the lift 71 increases with increasing angles of attack 72 until a maximum value for the lift is reached. This maximum lift for the second curve 74 is referenced to by the reference sign 741. The lift of the rotor blade is higher when the aerodynamic device is in its second configuration compared to the first configuration. This is—at least in the example shown here—valid for all relevant angles of attack greater than zero, and in particular also for the respective maximum lift values 731, 741. Thus, it can be concluded that the change of configuration of the aerodynamic device from the second into the first configuration effectively reduces the lift (and thus also the load) of the rotor blade.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine, the rotor blade comprising:
    an aerodynamic device for influencing an airflow flowing from the leading edge section of the rotor blade to the trailing edge section of the rotor blade, wherein the aerodynamic device is mounted at a surface of the rotor blade and comprises a pneumatic or hydraulic actuator of which the volume depends on the pressure of a fluid being present inside the pneumatic or hydraulic actuator, and
    a control unit for controlling the pressure of the fluid in the pneumatic or hydraulic actuator of the aerodynamic device, wherein
    the aerodynamic device is in a first configuration when no pressure application to the fluid in the pneumatic or hydraulic actuator is induced by the control unit,
    the aerodynamic device is in a second configuration when the control unit induces the application of a positive or negative pressure to the fluid in the pneumatic or hydraulic actuator,
    in the first configuration, at least a first section of the aerodynamic device protrudes away from the surface of the rotor blade into the airflow flowing from the leading edge section of the rotor blade to the trailing edge section of the rotor blade, and
    in the second configuration, the first section is positioned closer to the surface of the rotor blade than in the first position.

2. The rotor blade according to claim 1, wherein the lift of the rotor blade in the first configuration is smaller than the lift of the rotor blade in the second configuration.

3. The rotor blade according to claim 2, wherein the aerodynamic device comprises a bending part made of flexible material which allows the change of configuration of the aerodynamic device from the first configuration to the second configuration and vice versa.

4. The rotor blade according to claim 3, wherein the protrusion of the first section away from the surface of the rotor blade is caused, or at least supported, by pretensioning the bending part of the aerodynamic device.

5. The rotor blade according to claim 1, wherein, in the second configuration of the aerodynamic device, the aerodynamic device is at least partially embedded into a shell of the rotor blade.

6. The rotor blade according to claim 1, wherein the aerodynamic device extends in parallel to the length axis of the rotor blade.

7. The rotor blade according to claim 1, wherein the aerodynamic device extends over at least ten percent of the length of the rotor blade.

8. The rotor blade according to claim 1, wherein the aerodynamic device is placed between the leading edge of the rotor blade and fifty percent of the chord length of the rotor blade, as measured from the leading edge.

9. The rotor blade according to claim 1, wherein the rotor blade further comprises a flow regulating unit for influencing the airflow flowing from the leading edge section of the rotor blade to the trailing edge section of the rotor blade.

10. The rotor blade according to claim 9, wherein both the aerodynamic device and the flow regulating unit are mounted on the suction side of the rotor blade.

11. The rotor blade according to claim 9, wherein the flow regulating unit is placed between the aerodynamic device and the trailing edge of the rotor blade.

12. The rotor blade according to claim 11, wherein the chordwise distance between the aerodynamic device and the flow regulating unit is between ten percent and fifty percent of the chord length of the rotor blade.

13. The rotor blade according to claim 9, wherein the flow regulating device is placed between the leading edge of the rotor blade and the aerodynamic device.

14. The rotor blade according to claim 13, wherein the chordwise distance between the aerodynamic device and the flow regulating unit is between one percent and twenty percent of the chord length of the rotor blade.

15. The rotor blade according to claim 9, wherein the aerodynamic device itself is equipped with the flow regulating unit.

16. The rotor blade according to claim 9, wherein the flow regulating unit comprises a vortex generator.

17. A wind turbine for generating electricity comprising at least one rotor blade according to claim 1.

18. The rotor blade according to claim 1, wherein the pneumatic or hydraulic activator comprises at least one of a hose and a cavity.

* * * * *